United States Patent
Hayama et al.

(10) Patent No.: US 7,617,485 B2
(45) Date of Patent: Nov. 10, 2009

(54) APPARATUS FOR POINTING AN ACTION ATTRIBUTE OF ELECTRONIC APPLICATION SYSTEM

(75) Inventors: Hiroshi Hayama, Matsudo (JP); Hiroki Matsui, Komae (JP)

(73) Assignee: Hitachi, Ltd., Tokyo (JP)

( * ) Notice: Subject to any disclaimer, the term of this patent is extended or adjusted under 35 U.S.C. 154(b) by 1633 days.

(21) Appl. No.: 10/614,276

(22) Filed: Jul. 8, 2003

(65) Prior Publication Data

US 2004/0049661 A1 Mar. 11, 2004

(30) Foreign Application Priority Data

Jul. 11, 2002 (JP) .............................. 2002-202975

(51) Int. Cl.
*G06F 9/44* (2006.01)

(52) U.S. Cl. ..................................................... 717/125

(58) Field of Classification Search ......... 717/100–103, 717/125; 705/37; 726/1; 719/318; 709/223; 715/205, 210, 234, 226, 764

See application file for complete search history.

(56) References Cited

U.S. PATENT DOCUMENTS

| | | | |
|---|---|---|---|
| 6,621,505 B1* | 9/2003 | Beauchamp et al. | ........ 715/764 |
| 6,636,242 B2* | 10/2003 | Bowman-Amuah | ......... 715/764 |
| 7,051,316 B2* | 5/2006 | Charisius et al. | ............ 717/103 |
| 7,346,921 B2* | 3/2008 | Murren et al. | ................. 726/1 |
| 2001/0011295 A1 | 8/2001 | Kobayashi et al. | |

FOREIGN PATENT DOCUMENTS

| | | |
|---|---|---|
| JP | A-05-73290 | 3/1993 |
| JP | 11212772 | 8/1999 |
| JP | 2001216143 | 8/2001 |
| JP | 2002049493 | 2/2002 |

* cited by examiner

*Primary Examiner*—Tuan Anh Vu
(74) *Attorney, Agent, or Firm*—Brundidge & Stanger, P.C (57) ABSTRACT

In actions representing individual process businesses necessary for proceeding with processes concerning a computer system, action components representing individual business factors constituting each of said process businesses and programs for execution of the business factors, an action attribute pointing apparatus makes the correspondence between an action name assigned to an action to specify that action and an action component name assigned to an action component to specify that action component and makes the correspondence between the action component name and a program name assigned to a program to specify that program. The apparatus has component name correspondence information, program name correspondence information, an action attribute storage unit for storing them, a definition information input/execute unit, an action attribute storage contents prepare/update unit and an action control unit.

4 Claims, 6 Drawing Sheets

FIG. 2

```
<LEADING PART OMITTED>

#[Action Name]
# action<n>.name : ACTION NAME
action1.name    =Entry
action2.name    =SendMail
action3.name    =ChangeStatus
sequence1.name  =Nest1

#[Sequence Action]
# <ACTION NAME>.seq<n>.name : ACTION COMPONENT NAME
Entry.seq1.name    =verify@normal
Entry.seq2.name    =Nest1@normal
Entry.seq3.name    =receipt@normal SendMail.seq1.name =sendmail@normal
SendMail.seq2.name =changeStatus@normal
ChangeStatus.seq1.name =changeStatus@normal

Nest1.seq1.name    =entry@normal
Nest1.seq2.name    =sendMq@normal
Nest1.seq3.name    =sendFtp@error
Nest1.seq4.name    =sendMail@always

#[Action Component]
# <ACTION COMPONENT NAME>.class : ACTION COMPONENT CLASS NAME
# <ACTION COMPONENT NAME>.method : ACTION COMPONENT METHOD NAME
verify.class     =jp.co.hitachi.jkk.sinsei.action.component.PKI
verify.method    =xmlVerify
receipt.class    =jp.co.hitachi.jkk.sinsei.action.component.Receipt
receipt.method   =createReceipt
receipt.result   =receiptData sendmail.class   =jp.co.hitachi.jkk.sinsei.action.component.WebMail
sendmail.method  =createEntry
sendmail.result  =mailId
changeStatus.class =jp.co.hitachi.jkk.sinsei.action.component.Application
changeStatus.method =changeStatus

<REST OMITTED>
```

| | BUSINESS (61) | PROCESS (62) | PROCESS CONTENTS (63) |
|---|---|---|---|
| 1 | USER AUTHENTICATION | | PERFORM LOG-IN AUTHENTICATION ON THE BASIS OF USER ID AND PASSWORD |
| 2 | APPLICATION RECEPTION | SIZE CHECK | CONFIRM DATA SIZE OF TRANSMISSION DATA |
| 3 | | WRITTEN APPLICATION DATA FORMAT CHECK | PERFORM EXTENSION CHECK |
| 4 | | SIGNATURE VERIFICATION | VERIFY SIGNATURE OF WRITTEN APPLICATION |
| 5 | | WRITTEN APPLICATION DATA CONTENTS CHECK | CONFIRM ERRORS IN CONTENTS OF WRITTEN APPLICATION |
| 6 | | WRITTEN APPLICATION RECEPTION ID BESTOWAL | BESTOW RECEIPT ID TO RECEIVED WRITTEN APPLICATION |
| 7 | | DISTRIBUTION FUNCTION (APPLICATION DB) | STORE INFORMATION IN APPLICATION INTERNAL DB |
| 8 | | DISTRIBUTION FUNCTION (BUSINESS DB) | STORE INFORMATION IN BUSINESS DB |
| 9 | | RECEIPT ISSUE | PASS OVER EVIDENCE OF ACKNOWLEDGED RECEIPT OF WRITTEN APPLICATION TO APPLICANT |
| 10 | EXAMINATION | MAIL ISSUE | TRANSMIT MAIL TO APPLICANT |
| 11 | | APPLICATION STATUS CHANGE | CHANGE STATUS SUCH AS COMPLETED EXAMINATION IN CONNECTION WITH APPLIED MATTER |
| 12 | APPLICATION STATUS CONFIRMATION | | CONFIRM WHAT STATUS APPLIED MATTER IS PLACED IN (IN RECEPTION, IN EXAMINATION, COMPLETED EXAMINATION AND SO ON) |

APPARATUS FOR POINTING AN ACTION ATTRIBUTE OF ELECTRONIC APPLICATION SYSTEM

BACKGROUND OF THE INVENTION

The present invention relates to an apparatus for pointing an action attribute of an electronic application system used for dealing with various application procedures and notification procedures submitted to a local public body by residents or enterprises through a communication network and apparatus and method for pointing an action attribute of a program concerning a computer system.

Generally, in a computer system using a terminal, intended business affairs are dealt with by repeating a series of processes of displaying character and graphic information on the screen of the terminal and letting a user input information from, for example, a keyboard by making reference to the screen so that the next picture corresponding to the input information may be displayed on the screen.

A program responds to a result of processing of the screen input data inputted from the terminal to determine a picture to be displayed next and prepare screen output data of the next picture. Accordingly, in case a change in the order or sequence of displays on the screen is needed, the program must be changed.

Also, a program for processing data inputted to start with a particular picture is prepared on the presupposition of a particular picture to be displayed subsequently to the former particular picture. Accordingly, in case a business system using the identical picture plural times is set up and pictures to be displayed before or after the identical picture differ from each other, programs need to be prepared which comply with individual combinations. As will be seen from the above, in the conventional scheme, it is necessary that programs in different modes be prepared according to individual processing modes and these programs be prepared in consideration of the sequence relation between pictures.

Known as a program development contrivance concerning such pictures as above is JP-A-5-73290. The reference JP-A-5-73290 is concerned with programs in an interactive system and provides a program development scheme of interactive system that can afford to permit a program to be prepared and developed independently of the display sequence of pictures.

Generally, in developing a program pursuant to Java (R), there is available a MVC (Model-View-Controller) model. The model is a business program for constructing business logic. The view plays the role of showing results of execution of the business program to users. The controller plays the role of controlling the execution of the business program. Specifically, the controller controls making of the correspondence between a picture and a process program corresponding thereto (business program).

In developing the system, the correspondence between a picture and a process program corresponding thereto (business program) has hitherto been made but there is a growing need for a scheme capable of making the correspondence between a process program and another process program so as to deal with development of a system such as an electronic application system in which processing of the program per se is complicated.

In developing the system, the more the function to improve services to residents and enterprises, the robustness of system, the prevention of unauthorized access and the function to detect falsity and spoofing of electronic documents are supported as in the case of the electronic application system, the more the system becomes increased in scale and sophisticated. In consequence, the development scale of the system expands to increasingly affect the development costs and schedule.

The system development is mainly carried out using, in combination, programs called components representing parts for development. The components are sorted into components executable during normal operation, components executable during occurrence of exceptional operation and components executable during both the normal and exceptional operations and they are sequentially called or accessed and executed to operate the whole of the system. In the event that a need of addition/modification arises newly, for example, there arises an instance in which an access from a host component to a slave component is modified, modification of the program also spreads to the host and slave components and the range of verification test concomitant with the modification is expanded. Further, in order to conduct a complicated process, preparation/modification of the slave component is done frequently, leading to a situation that the effect of development efficiency cannot be obtained. Accordingly, the advent of an apparatus or a method is needed which can make a process program related to another process program calling the former process program such that the influence of modification of a component does not affect directly another component and which can define the execution order or sequence of process programs, whereby the program can be modified by simply changing the making of relation and the definition of execution sequence.

SUMMARY OF THE INVENTION

An object of this invention is to provide an apparatus for pointing an action attribute of electronic application system, apparatus and method for pointing an action attribute of program and a computer system, each of which can conduct development and modification without spreading the influence of modification to a great extent even when modification of a host component and preparation/modification of a slave component are carried out frequently, whereby the effect of development efficiency concerning development and modification of the computer system such as an electronic application system can be obtained sufficiently.

In other words, the present invention is concerned with the apparatus for pointing an action attribute of electronic application system, the apparatus and method for pointing an action attribute of program and the computer system.

In actions representing individual process businesses necessary for proceeding with processes concerning the computer system, action components representing individual business factors constituting each of the process businesses and programs for execution of the business factors, the action attribute pointing apparatus makes the correspondence between an action name assigned to an action for specifying that action and an action component name assigned to an action component for specifying that action component and makes the correspondence between the action component name and a program name assigned to a program for specifying that program.

Structurally, the action attribute pointing apparatus comprises component name correspondence information and program name correspondence information, an action attribute storage unit for storing them, a definition information input/execute unit, an action attribute storage contents prepare/update unit and an action control unit.

Here, the component name correspondence information is information for making the correspondence between an action name and an action component name, the program name correspondence information is information for making the correspondence between the action component name and a program name and they are stored in the action attribute storage unit. The definition information input/execute unit fulfils a function to input definition information concerning the correspondence information stored in the action attribute storage unit. The action attribute storage contents prepare/update unit fulfils a function to prepare/update the contents of the action attribute storage unit on the basis of the definition information inputted by means of the definition information input/execute unit. The action control unit fulfils a function to control the execution of an action component by consulting with the correspondence information of the action attribute storage unit. Specifically, the action control unit fulfils a function to perform control, differing from the picture transition control, of the process sequence of programs executed as action components.

The action attribute pointing apparatus as above is so constructed as to have the action attribute storage unit storing the component name correspondence information and program name correspondence information, the definition information input/execute unit, the action attribute storage contents prepare/update unit and the action control unit and therefore, even when modification of a host component and preparation/modification of a slave component are carried out frequently, mere making of the correspondence of the correspondence information needs to be changed without requiring the program per se except its modified portion to be changed, thereby preventing the influence of the modification from spreading to a great extent. Accordingly, this ensures that the effect of development efficiency concerning development and modification of the electronic application system and computer system can be obtained sufficiently.

Further, from the standpoint of the fact that in connection with the execution sequence of action components and the action components during their execution, it is necessary that normal time execution executable during normal operation, exception occurring time execution executable during occurrence of exceptional operation and indispensable execution executable during both the normal and exceptional operations can be defined and layering or hierarchical structuring of processes can also be defined, the action attribute storage unit preferably includes component execution sequence information and component execution form information.

Here, the component execution sequence information is information for defining the execution sequence of action components and the component execution form information is information for defining, in connection with action components during their execution, normal time execution executable during normal operation, exception occurring time execution executable during occurrence of exceptional operation and indispensable execution executable during both the normal and exception operations and also defining layering of processes. Either information is stored in the action attribute storage unit.

The action attribute pointing method is a method comprising a step of pointing an action attribute by using the action attribute storage unit adapted to store the component name correspondence information and program name correspondence information, a definition information input/update step of inputting definition information concerning the correspondence information, an action attribute storage contents prepare/update step of preparing/updating the contents of the action attribute storage unit, and an action control step of controlling the execution of the action components.

More specifically, the definition information input/execute step is a step of inputting definition information concerning the correspondence information stored in the action attribute storage unit, the action attribute storage contents prepare/update step is a step of preparing/updating the action attribute storage unit on the basis of the definition information inputted in the definition information input/execute step and the action control step is a step of controlling the execution of the action components by consulting with the correspondence information of the action attribute storage unit.

Structurally, the action attribute pointing method as above comprises the step of pointing an action attribute by using the action attribute storage unit adapted to store the component name correspondence information and program name correspondence information, the definition information input/execute step, the action attribute storage contents prepare/update step and the action control step, whereby even when modification of a host component and preparation/modification of a slave component are carried out frequently, this can be dealt with by merely changing making of the correspondence of the correspondence information without resort to changing the program per se except its modified portion, thus ensuring that the modification can be made without spreading its influence to a great extent. Accordingly, through this, the effect of development efficiency concerning development and modification of the electronic application system and computer system can be obtained sufficiently.

Further, considering that in connection with the execution sequence of action components and the action components during their execution, it is necessary to permit normal time execution executable during normal operation, exception occurring time execution executable during occurrence of exceptional operation and indispensable execution executable during both the normal and exceptional operations to be defined and also to permit layering of processes to be defined, the action attribute storage unit preferably includes the component execution sequence information and component execution form information.

Other objects, features and advantages of the invention will become apparent from the following description of the embodiments of the invention taken in conjunction with the accompanying drawings.

DETAILED DESCRIPTION OF THE EMBODIMENTS

The present invention will now be described by way of example with reference to the accompanying drawings.

In the following description, the action attribute storage unit will be described as including an action attribute file and an action attribute file storage device for storing the action attribute file. Also, the action attribute storage contents prepare/update unit corresponds to an action attribute file prepare/update unit and the action attribute storage contents prepare/update step corresponds to an action attribute file prepare/update step.

1. Action Attribute Pointing Apparatus

Figure 1:
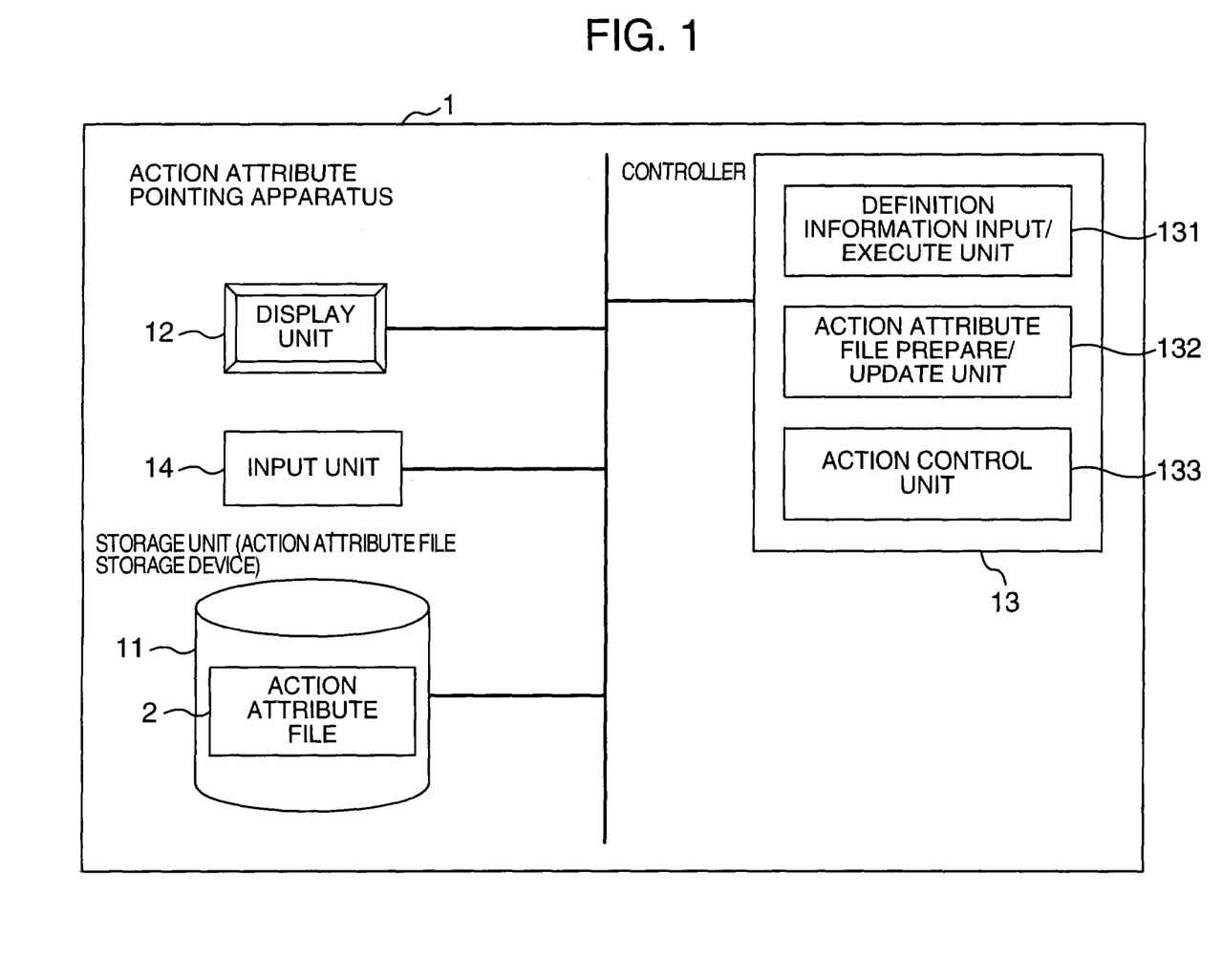
FIG. 1 is a schematic diagram showing an example of construction of an action attribute pointing apparatus.

Referring to FIG. 1, an action attribute pointing apparatus 1 is constructed as shown therein.

The action attribute pointing apparatus 1 comprises a storage unit 11 for storing an action attribute file 2 to be described later, a display unit 12 for displaying information such as definition information, a controller 13 for performing control of the display unit 12 and an input unit 14 for receiving an input such as the definition information.

The storage unit 11 is constructed of, for example, a HDD (Hard Disk Drive). As the display unit 12, a monitor utilizing a liquid crystal display or CRT (Cathode-Ray Tube), for instance, can be used. The controller 13 has a central processing unit, a memory device and the like and with a predetermined program developed and started, it can implement various processes. The input unit 14 is constructed of, for example, a keyboard, mouse or pen tablet.

The above constitutional components will now be described in greater detail.

(1) Action Attribute File Storage Device

The action attribute file storage device fulfils a function to store the action attribute file 2. Held in the action attribute file 2 are component name correspondence information and program name correspondence information.

In actions representing individual process businesses necessary for proceeding with processes concerning a computer system, action components representing individual business factors constituting each of the process businesses and programs for execution of business factors, the component name correspondence information is information for making the correspondence between an action name assigned to an action for specifying that action and an action component name assigned to an action component for specifying that action component.

The program name correspondence information, on the other hand, is information for making the correspondence between the action component name and a program name assigned to a program for specifying that program.

As will be described later, businesses, processes and process contents concerning an application in an electronic application system are exemplified in a table of FIG. 6. As for an application, its business consists of user authentication, application reception, examination and so on and its process consists of size check, written application format check and so on. In the figure, the business corresponds to action 61, the process corresponds to action component 62 and the process contents corresponds to executable program 63.

Figure 2:
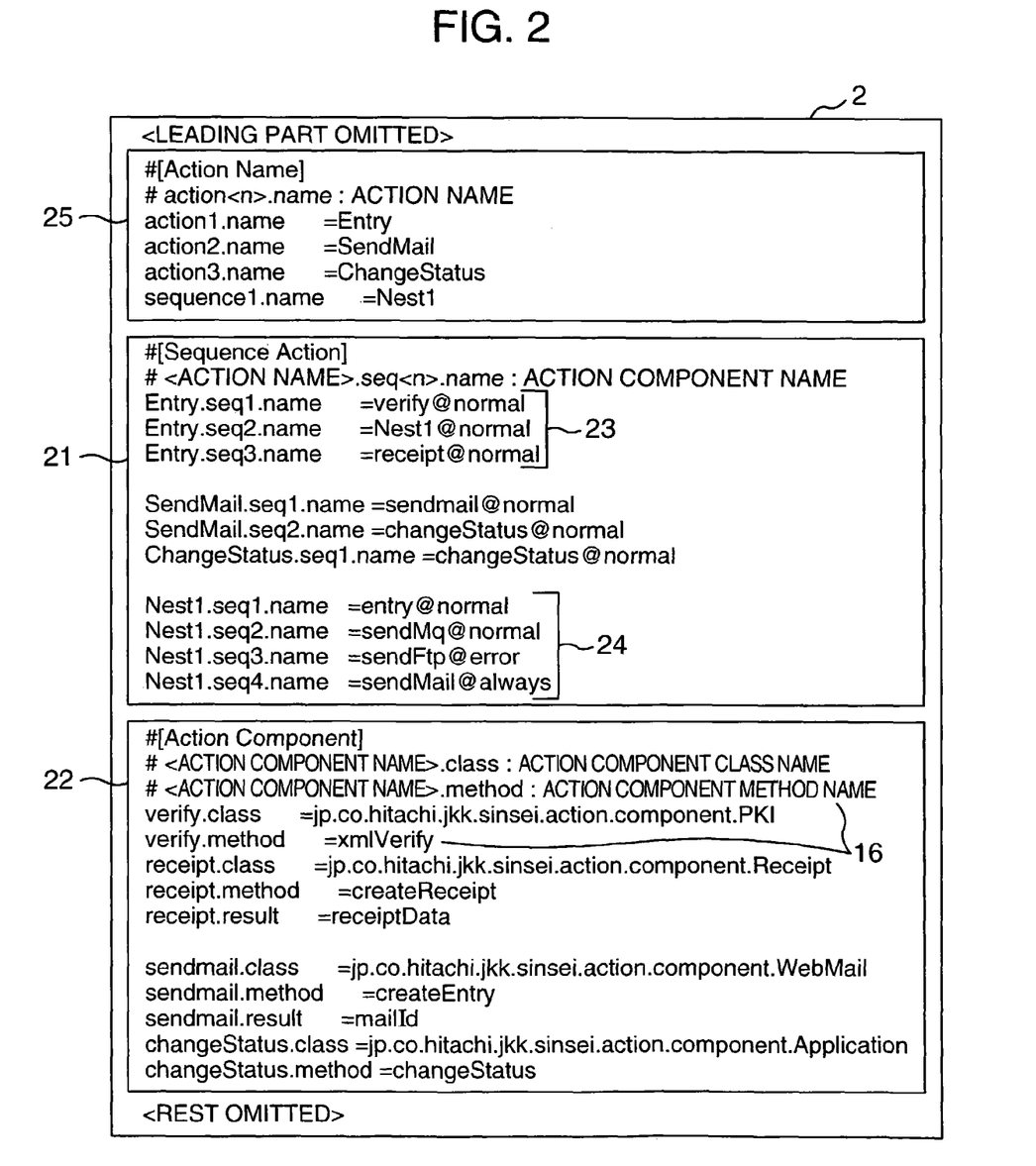
FIG. 2 is a diagram showing an example of setting in an action attribute file.

Reverting to FIG. 2, an example of setting in the action attribute file 2 is shown. The action attribute file 2 is comprised of an action name section 25, a sequence action section 21 and an action component section 22.

The action name section 25 consists of action names for specifying actions. In this example, three action names are included, indicating Entry, SendMail and ChangeStatus. The action may be of any contents which is not specifically designated.

The sequence action section 21 provides component name correspondence information 21 for making the correspondence between an action name and an action component name. In this example, an action named by the action name Entry is executed by making the correspondence between it and action components named by action component names verify, Nest1 and receipt, respectively. The Nest 1 further executes components named by action component names entry, sendMq, sendftp and sendMail, respectively.

The action component section 22 provides program name correspondence information 22 for making the correspondence between an action component name and a class/method name of the action component. The method name corresponds to a program name 26 in actual operation. In this example, an action component by the name of action component name verify is made to correspond to a program named by a program name 26 of xmlverify.

An action control unit 133 to be described later consults with the action attribute file 2 so that when receiving an action of an action name of Entry, the action control unit may first operate an action component of an action component name of verify (in this case, the program named by the program name xmlverify is operated) and then operate the Nest 1 and receipt in this order.

In case the action name verify is now modified so as to operate, for example, a program named by a program name xmlVerify 2 in place of the program name xmlverify, it suffices that the xmlVerify is simply changed to the xmlverify 2 substituting therefor and the program for calling the xmlverify need not be modified in itself.

The action attribute file 2 also includes component execution sequence information 23 for prescribing the execution sequence of action components and component execution form information 24 for permitting, in connection with the action components during their execution, normal time execution executable during normal operation, exception occurring time execution executable during occurrence of exceptional operation and indispensable execution executable during both normal and exceptional operations as well layering of processes.

The sequence action section 21 of the action attribute file 2 shown in FIG. 2 also provides the component execution sequence information 23 for prescribing the execution sequence of action components. In this example, the action of action name Entry is so prepared as to execute action components of action component names verify, Nest 1 and receipt in this order.

In case the execution sequence of action components is so modified as to be changed, for example, when changing the execution sequence between verify and Nest 1, it suffices that in the sequence action section 21, the order of verify, Nest 1 and receipt of the component execution sequence information 23 is simply changed to the order of Nest 1, verify and receipt and in this case, too, the program need not be modified in itself.

Next, the component execution form information 24 will be described.

In FIG. 2, when having action component names, the component name correspondence information 21 can further designate @XXX as a designation value. The @XXX permits layering or hierarchical structuring of action components. It also permits a process executable during occurrence of exceptional operation and a process executable regardless of the occurrence of an exception. The component execution form information 24 makes it possible to set up sophisticated sequences as in the case of the electronic application system.

The component execution form information 24 includes a normal execution action component (@normal), an exception occurring time execution action component (@error) and an indispensable execution action component executable during both normal and exceptional operations (@always).

Figure 3:
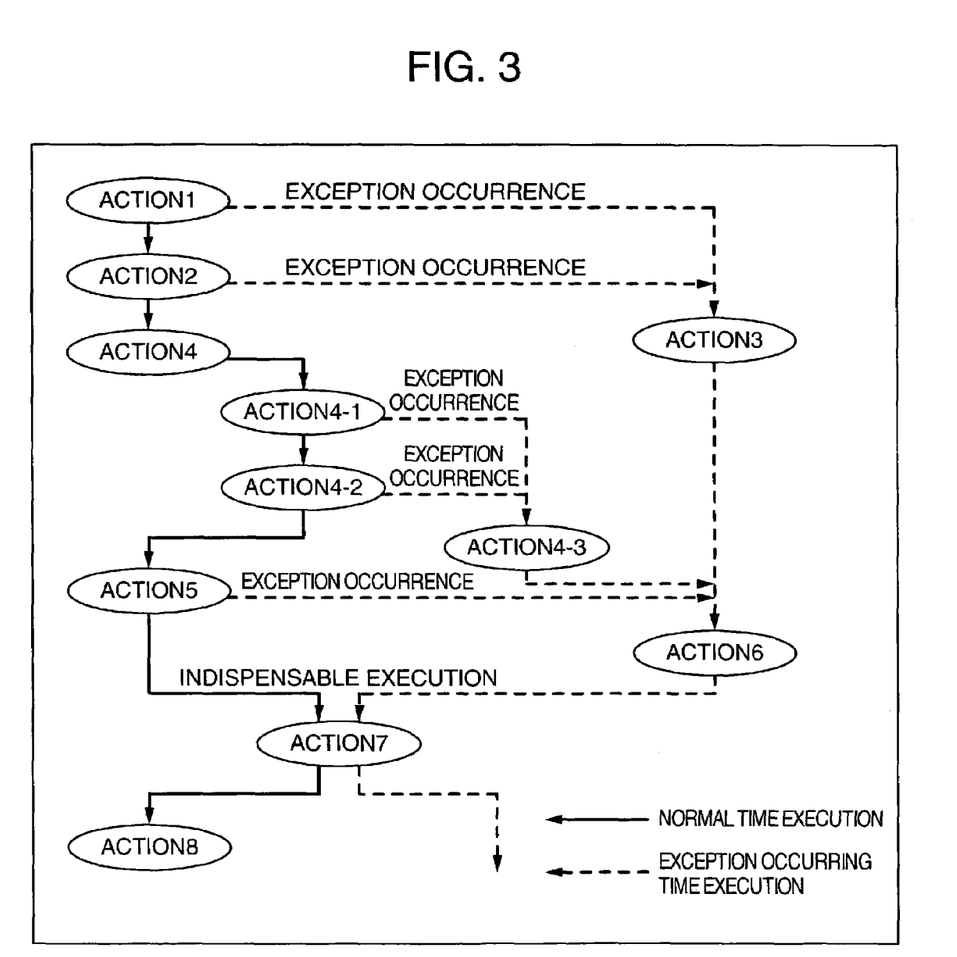
FIG. 3 is a diagram showing an example of the sequence of execution of action components.

Exemplified in FIG. 3 are the execution sequence of action components, the normal time execution, the exception occurring time execution and the indispensable execution. Individual action components are indicated by action 1 to action 8. Here, the action 1 is an action component executable during normal operation, having a designated value of @normal. The action 3 is an action component executable during occurrence of exceptional operation, having a designated value of @error and the action 7 is an action component executable during both normal and exceptional operations, having a designated value of @always.

For the purpose of executing the process sequence of FIG. 3, the action attribute file 2 is structured as below, where AAA stands for the action name in FIG. 3.

AAA.seq1.name=action1@normal
AAA.seq2.name=action2@normal
AAA.seq3.name=action3@error
AAA.seq4.name=nestl@normal
AAA.seq5.name=action5@normal
AAA.seq6.name=action6@error
AAA.seq7.name=action7@always
AAA.seq8.name=action 8@normal
nest1.seq1.name=action4@normal
nest1.seq2.name=action4-1@normal
nest1.seq3.name=action4-2@normal
nest1.seq4.name=action 4-3@error (2) Definition Information Input/execute Unit A definition information input execute unit 131 shown in FIG. 1 fulfils a function to input definition information concerning the aforementioned correspondence information held in the action attribute file 2. In other words, this unit operates to input action names, action component names and program names.

(3) Action Attribute File Prepare/update Unit

An action attribute file prepare/update unit 132 shown in FIG. 1 fulfils a function to prepare/update the action attribute file 2 on the basis of the definition information inputted by the definition information input/execute unit 131.

This unit operates to prepare or update the action attribute file 2 of FIG. 2 according to the inputted action name, action component name and program name. More specifically, it prepares or updates the component name correspondence information 21, program name correspondence information 22, component execution sequence information 23 and component execution form information 24.

(4) Action Control Unit

The action control unit 133 fulfils a function to control access and execution of action components by making reference to the correspondence information of the action attribute file 2. This action control unit does not perform the picture transition control but fulfils a function of controlling the process sequence of programs to be executed as action components.

Figure 4:
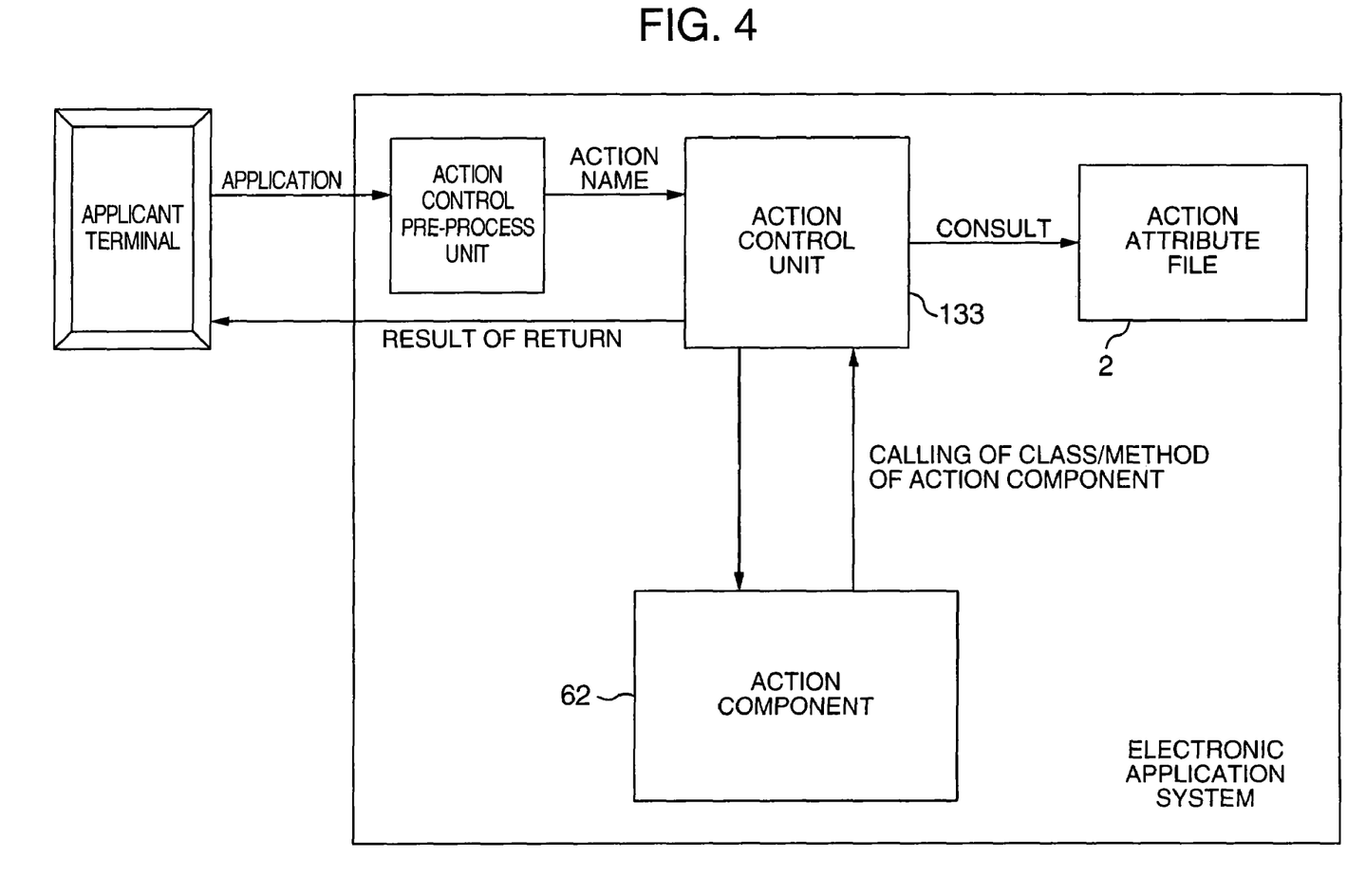
FIG. 4 is a schematic diagram of an embodiment of an electronic application system according to the invention.

Referring now to FIG. 4, an electronic application system is schematically illustrated. As shown in FIG. 4, the action control unit 133 executes calling of class/method of an action component 62 while consulting with the action attribute file 2 by using, as a key, an action name given on the basis of an application from an applicant terminal.

The action control unit 133 can operate as part of a computer system such as electronic application system, electronic notification system, information open system or reception counter system and can control calling and execution of action components by consulting the correspondence information of the action attribute file 2.

Accordingly, the action attribute pointing apparatus 1 as above is so constructed as to comprise the action attribute file 2 holding the component name correspondence information 21 and program name correspondence information 22, the action attribute file storage device 11, definition information input/execute unit 131, action attribute file prepare/update unit 132 and action control unit 133, whereby even when modification of a host component and preparation/modification of a slave component are carried out frequently, this can be dealt with by merely changing making of the correspondence of the correspondence information without resort to changing of the program per se except its modified portion, thus preventing the influence of the modification from spreading to a great extent. In consequence, this ensures that the effect of development efficiency concerning development and modification of the electronic application system and computer system can be obtained sufficiently.

2. Action Attribute Pointing Method

Figure 5:
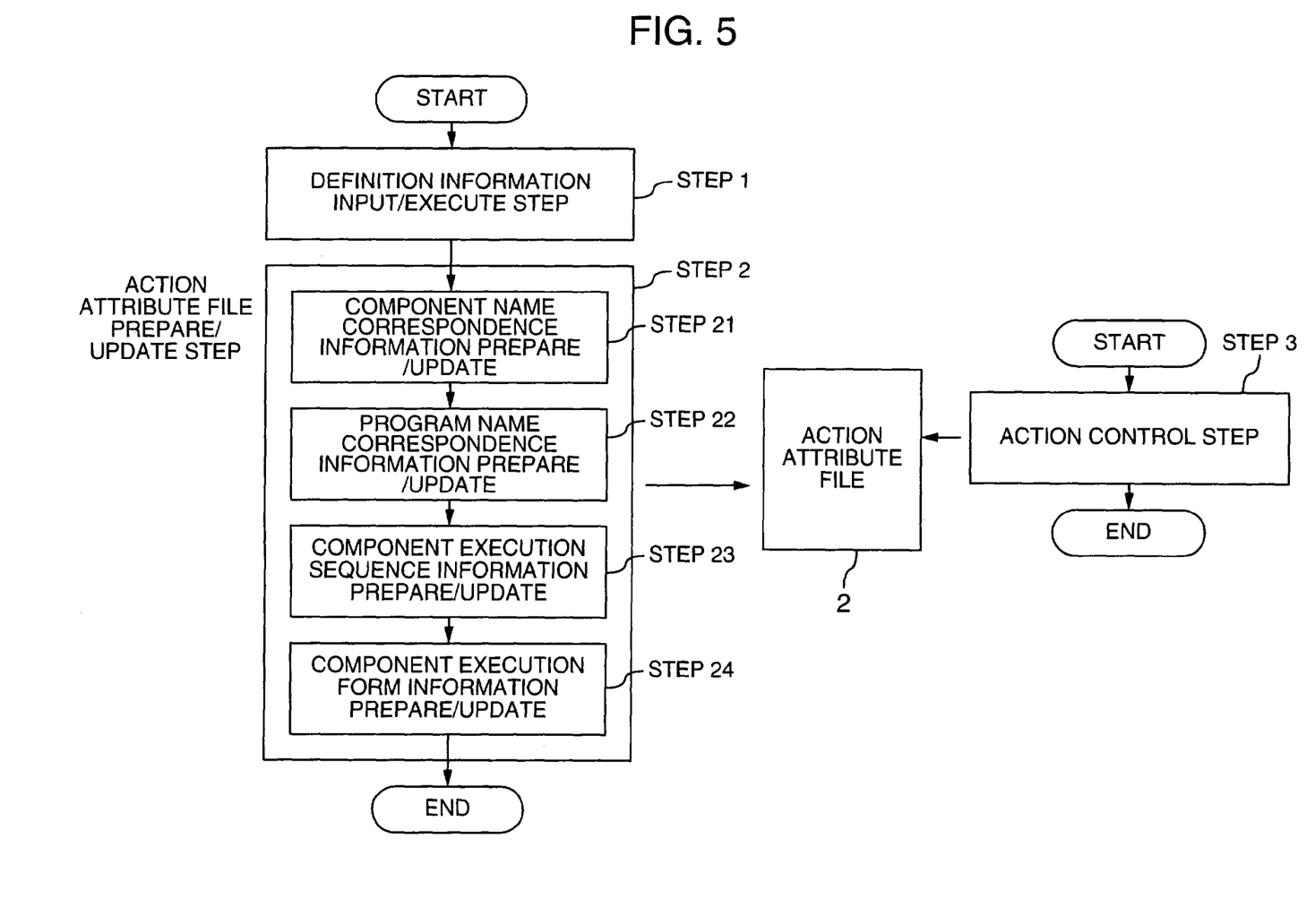
FIG. 5 is a flowchart showing an embodiment of an action attribute pointing method according to the invention.

Referring to FIG. 5, there is illustrated a flowchart for explaining an action attribute pointing method according to an embodiment of the invention. Individual steps will be described hereunder with reference to FIG. 5. Each step in the flowchart can be executed as a program of a computer serving as the action attribute pointing apparatus 1.

(1) Step 1

Definition information input/execute step is a step of inputting definition information concerning the correspondence information held in the action attribute file 2.

In other words, this step is to input the action name, action component name and program name.

(2) Step 2

Action attribute file prepare/update step is a step of preparing/updating the action attribute file 2 on the basis of the definition information inputted in the definition information input/execute step. This step is to prepare or update the action attribute file 2 in accordance with the inputted action name, action component name and program name. Namely, this step 2 includes steps of preparing or updating the component name correspondence information 21, program name correspondence information 22, component execution sequence information 23 and component execution form information 24, respectively.

(3) Step 3

Action control step is a step of controlling the execution of the action component by consulting the correspondence information of the action attribute file 2. This step 3 consults the action attribute file 2 by using an action name as a key to execute calling of a class/method of the action component.

The step 3 of FIG. 5 can operate as part of the computer system such as electronic application system, electronic notification system, information open system or reception counter system and in this action control step, calling and execution of an action component is controlled by consulting the correspondence information of the action attribute file 2.

Next, the aforementioned embodiment will be described by way of example of an electronic application system.

The electronic application system supports functions to ensure safety and services, including a function to identify and authenticate users when residents or enterprises utilize this system, a function to receive a matter applied and to notify an applicant of examination status and result, a function to refer to the contents of a written application and examine whether the format is legal and a function to verify digital signature and validity. It is to be noted that terms "residents" and "enterprises" may cover a group such as body and union.

Figure 6:
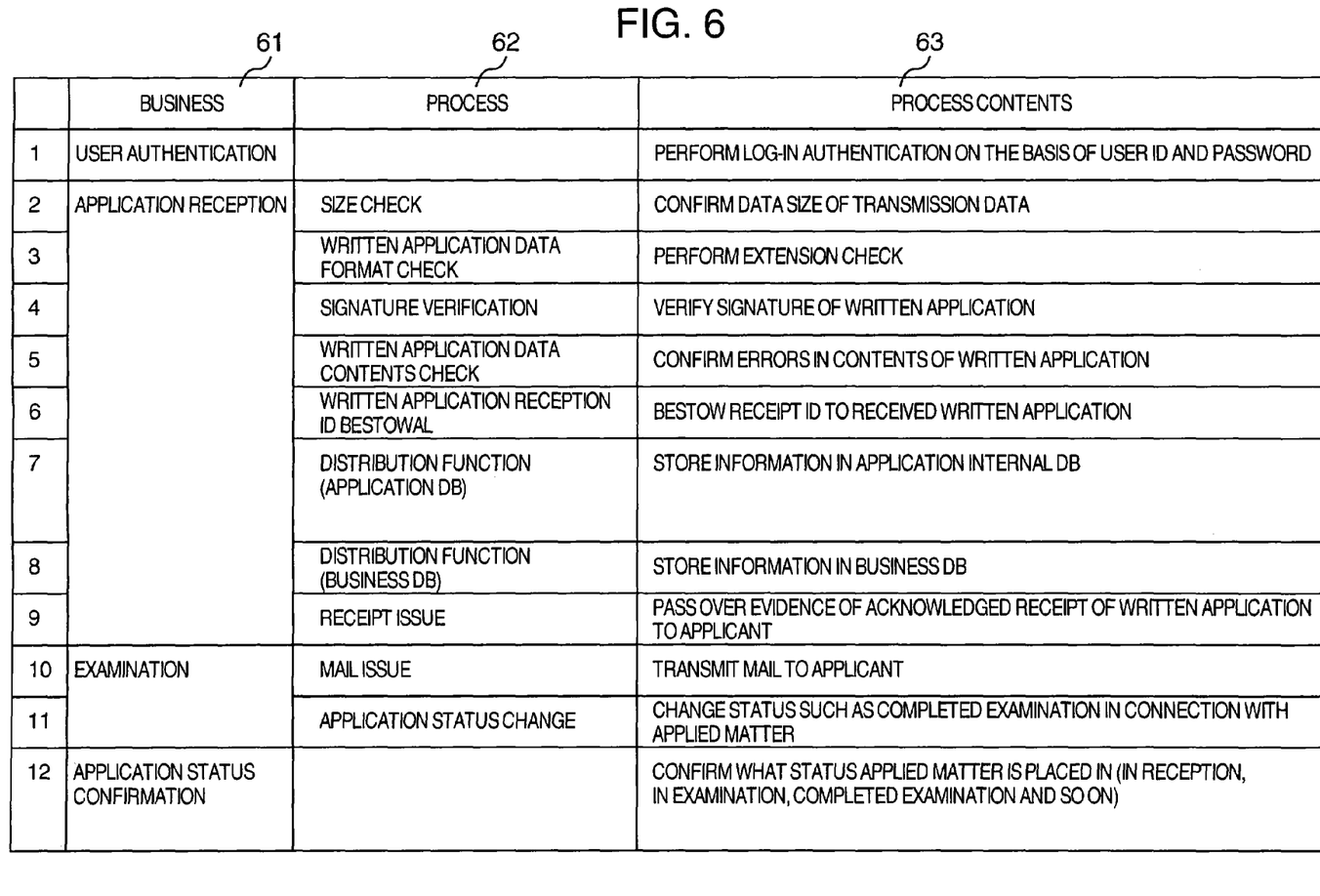
FIG. 6 is a table showing an example of business affairs and process contents concerning an application in the electronic application system.

Turning to FIG. 6, there is shown a table showing the contents of business and process concerning an application in the electronic application system.

The illustration as a whole is one application and business column corresponding to action 61 involves user authentication, application reception, examination and application status confirmation. Process column corresponding to action component 62 involves size check, written application data format check, signature verification and receipt issue. Process contents 63 is the contents the program executes actually. Indicated herein are action components executable normally and assigned with @normal. For example, an action component for preparing a message notified to the applicant in the event that abnormality is detected through check of the written application data format and process of signature verification is an action during occurrence of exceptional operation and designated with @error. An action component for transmitting messages is executed during both normal and exceptional operations and is therefore assigned with @always.

An applicant uploads written application data to the electronic application system from an applicant terminal. When receiving the written application data, the electronic application system executes written application data format check and process for verifying an electronic signature. The format check is to verify whether the written application is formatted correctly and the electronic signature verification is to verify whether the written application has authenticity. If nothing is the matter, evidence of acknowledged receipt of the written application data is returned to the applicant. The verification of electronic signature includes an additional process of inquiring of a certificate authority if the key used for encryption belongs to the user itself.

Accordingly, even in the case of electronic signature verification only, the processes including application reception, signature verification, key verification and inquiry of the certificate authority are sophisticated and hierarchically structured. In addition, execution processes at the time that exceptions occur in each of the above processes are involved. Here, the action attribute file 2 may be prepared as below. Where the action name is "application reception" and the action component names are "verification of signature", "verification of key" and "certificate authority", <application reception>.seq1.name
=<verification of signature> @normal
<application reception>.seq2.name
=nest@normal
nest.seq1.name
=<verification of key> @normal
nest.seq2.name
=<certificate authority> @normal Preparation of this action attribute file is carried out in the definition information input/execute step and action attribute file prepare/update step. Further, the action control step consults this action attribute file to execute calling of an action component.

In the event that an exceptional action component of action component named by action component name "verification of signature" occurs, the next action component name nest is not executed. Namely, the action attribute file is added with an action component executable during occurrence of exceptional operation and an indispensable execution action component. If, desirably, the process is be changed in this phase, it suffices that a program name having the correspondence with an action name in question is merely changed. If the sequence of process of the action component is to be changed, the sequence of the aforementioned definition is merely changed without resort to any change of the program per se, thereby obtaining the effect of development efficiency sufficiently.

As to the sequence of action components, a sequence change can be carried out between, for example, the check of written application format and the signature verification process. This can be accomplished by merely changing the action attribute file without changing the program per se.

Accordingly, the action attribute pointing method of electronic application system as above is so constructed as to comprise the action attribute file 2 holding the component name correspondence information 21 and program name correspondence information 22, the definition information input/execute step, the action attribute file prepare/update step and the action control step, whereby even when modification of a host component and preparation/modification of a slave component are carried out frequently, making the correspondence of the correspondence information can simply be changed without resort to changing of the program per se except its modified portion, thereby preventing the influence of modification from spreading to a great extent. Accordingly, this ensures that the effect of development efficiency concerning development and modification of the electronic application system can be obtained sufficiently.

The present invention set forth so far is in no way limited to the foregoing embodiments and can be altered/modified extensively. An example of the electronic application system is described in connection with FIG. 4 but the present invention can also be applied to other examples such as electronic notification system, information open system, reception counter system and the like.

In the development of the electronic application system and computer system, the test range of components can be relieved by preparing the action attribute file and even when modification of a host component and preparation/modification of a slave component are carried out frequently, the program per se except its modified portion need not be changed and therefore the development can be executed without spreading the influence of the modification to a large extent. Further, since the action attribute file can be assigned with an action executable during normal operation, an action executable during occurrence of exceptional operation and action executable during both normal and exceptional operations to hierarchically structure the program and execute it, sophisticated sequence logic can be set up and incorporated.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An apparatus for pointing an action attribute of an electronic application system which performs a process concerning an application from one of applicant terminals targeted to applicants such as residents or enterprises by using actions representing individual process businesses necessary for proceeding with the process concerning the application, action components representing individual business factors constituting each of said process businesses and having a nested structure and programs for execution of said business factors, said action attribute pointing apparatus for electronic application system comprising:

a storage unit for storing an action attribute file including:
component name correspondence information for making the correspondence between an action name and at least one action component name and defining a first execution order of the action components when the action name corresponds to plural action component names, further making the correspondence between the action component name and plural nested action component names and defining a second execution order of the nested action components, and program name correspondence information for making the correspondence between said action component name and a program name assigned to said program to specify said program;

a display unit for displaying definition information concerning the component name correspondence information and the program name correspondence information stored in the storage unit;

an input unit for inputting the definition information concerning said component name correspondence information and the program name correspondence information;

an execution unit for retrieving the component name correspondence information stored in the storage unit using the action name obtained from the application received from the applicant terminal as a key to specify the action component names and the execution order corresponding to the action name, retrieving the program name correspondence information stored in the storage unit using the specified action component names as keys to specify the program names corresponding the action component names, and executing the programs identified by the specified program names in order of the specified first execution order and the specified second execution order; and control unit for making the display unit display a screen for updating the definition information concerning the component name correspondence information stored in the storage unit, when at least one of the first execution order and the second execution order is changed, receiving update information for updating at least one of the first execution order and the second execution order from the input unit, and updating the component name correspondence information based on the received update information without updating the program name correspondence information.

2. An action attribute pointing apparatus for electronic application system according to claim 1, wherein said action component name is attached with component execution form information for defining, in connection with said action components during their execution, one of normal time execution executable during normal operation, exception occurring time execution executable during occurrence of exceptional operation and indispensable execution executable during both the normal and exceptional operations, and wherein said execution unit refers to the component execution form information and controls the execution of the action components according to the component execution form information.

3. A method for pointing an action attribute of an electronic application system which performs a process concerning an application from one of applicant terminals targeted to applicants such as residents or enterprises by using actions representing individual process businesses necessary for proceeding with the process concerning the application, action components representing individual business factors constituting each of said process businesses and having a nested structure and programs for execution of said business factors, said action attribute pointing method executed by a computer of said electronic application system comprising the steps of:

storing into a storage unit an action attribute file including:

component name correspondence information for making the correspondence between an action name and at least one action component name and defining a first execution order of the action components when the action name corresponds to plural action component names, further making the correspondence between the action component name and plural nested action component names and defining a second execution order of the nested action components, and program name correspondence information for making the correspondence between said action component name and a program name assigned to said program to specify said program;

displaying on display unit definition information concerning the component name correspondence information and the program name correspondence information stored in the storage unit;

inputting from an input unit the definition information concerning said component name correspondence information and the program name correspondence information;

retrieving the component name correspondence information stored in the storage unit using the action name obtained from the application received from the applicant terminal as a key to specify the action component names and the execution order corresponding to the action name;

retrieving the program name correspondence information stored in the storage unit using the specified action component names as keys to specify the program names corresponding to the action component names;

executing the programs identified by the specified program names in order of the specified first execution order and the specified second execution order;

making the display unit display a screen for updating the definition information concerning the component name correspondence information stored in the storage unit, when at least one of the first execution order and the second execution layer is changed;

receiving update information for updating at least one of the first execution order and the second execution order from the input unit; and updating the component name correspondence information based on the received update information without updating the program name correspondence information.

4. An action attribute pointing method for electronic application system according to claim 3, wherein said action component name is attached with component execution form information for defining, in connection with said action components during their execution, one of normal time execution executable during normal operation, exception occurring time execution executable during occurrence of exceptional operation and indispensable execution executable during both the normal and exceptional operations, and wherein said component execution form information is referred by the computer and used to control the execution of the action components.

* * * * *